United States Patent Office 3,690,869
Patented Sept. 12, 1972

3,690,869
MARTENSITE STAINLESS STEEL
Yakov Mikhailovich Potak, Zelenodolskaya, ulitsa 23, korpus 1, kv. 29; Julian Felixovich Orzhekhovsky, Leningradskoe shosse 75, korpus 2, kv. 25; Vladimir Vladimirovich Sachkov, Scherbakovskaya ulitsa 40, kv. 160; Efim Solomonovich Kagan, Profsojuznaya ulitsa 40, korpus 1, kv. 10; Anna Ivanovna Valdman, 1-i pereulok Izmailovskogo zverintsa 7, kv. 2; Nadezhda Nikolaevna Shpagina, 9-ya ulitsa Sokolinoi Gory 3, kv. 40; Mikhail Vasilievich Poplavko-Mikhailov, Maly Pionersky pereulok 5, kv. 56; Alexandr Pavlovich Fomin, 4-i Voikovsky proezd 3, korpus 1, kv. 154; and Simon Leibovich Natapov, Leningradsky prospekt 24, kv. 8, all of Moscow, U.S.S.R.
No Drawing. Filed Aug. 26, 1970, Ser. No. 67,217
Int. Cl. C22c 37/10
U.S. Cl. 75—124                                1 Claim

ABSTRACT OF THE DISCLOSURE

The proposed invention relates to a material for welding-wire for steels, which material comprises carbon, manganese, silicon, nickel, chromium, titanium, aluminum, molybdenum, zirconium, calcium, boron and iron.

FIELD OF THE INVENTION

The present invention relates to a material for welding-wires for welding steel, mainly stainless steel.

DESCRIPTION OF PRIOR ART

Employed presently for welding high-strength stainless steels with a tensile strength of 120–140 kg./mm.$^2$ are filler wires, in which the carbon content is usually 0.07–0.12%.

Also known in the art is welding wire, comprising (in weight percent):

C—not more than 0.08%,
Si—not more than 0.7%.
Mn—not more than 1%,
Ni—4.5–5.8%,
Cr—13.5–14.8%,
Ti—0.03–0.15%,
Cu—1.75–2.5%,
S—not more than 0.025%,*
P—not more than 0.03%,*
Fe—the rest.

*Undesirable inevitable admixtures present in filling stock.

However, when components are welded with said wire without their subsequent heat treatment, there results a lowered impact ductility (up to 2 kgm./cm.$^2$) of a weld metal with martensite structure, which is due to the relatively high carbon content in the weld metal, and columnar crystallization emerging in its structure.

With such low impact ductility, an early brittle failure of welded structures, particularly large-sized structures, is possible.

FIELD OF THE INVENTION

The object of our invention is to provide a welding wire, that ensures high impact ductility of weld metal without its heat treatment after the welding process, at the same time maintaining high strength of the welded joints.

DESCRIPTION OF THE INVENTION

Proposed herein is an alloy composition for welding wire for steel, mainly stainless steel comprising carbon, silicon, manganese, nickel, chromium, titanium, iron. The distinguishing feature of the wire is that introduced thereinto are aluminum, molybdenum, zirconium, calcium, boron, with the following ratio of all the constituents (in weight percent):

C—not more than 0.03%,
Mn—0.6–0.9%,
Si—1.4–1.7%,
Ni—8.5–9.0%,
Cr—11.4–11.8%,
Ti—0.2–0.3%,
Al—0.05–0.1%,
Mo—1.8–2.2%,
Zr—0.02–0.08%,
Ca—0.001–0.05%,
B—0.001–0.003%,
Fe—the rest.

Employment of the proposed wire without any subsequent heat treatment of the welded joints makes it possible to obtain a weld metal with a martensite structure featuring high ductility (14 kgm./cm.$^2$) due to a particularly low carbon content (below 0.03%).

Introduction of zirconium and titanium into the wire composition permits a fine-grained structure of the weld, which also raises the ductility of the deposited metal.

A formation in the weld structure of fine inclusions of $\delta$-ferrite excludes columnar crystallization of the weld metal which would lead to the reduction of its ductility.

Unlike the aforesaid prior art composition for welding-wire, wherein metal is deoxidized in the course of welding mainly on the account of the considerably high carbon content (not in excess of 0.08%), in the proposed wire comprising 0.03% of carbon and less, deoxidation is achieved on the account of elevated content of silicon and manganese, and presence of titanium and aluminum.

DESCRIPTION OF PREFERRED EMBODIMENTS

For better understanding the subject matter of the invention, given below are examples of preferred compositions of the proposed welding wire, and a description of their properties.

EXAMPLE 1

The wire may have the following composition (in weight percent):

C—not in excess of 0.03%
Mn—0.6%
Si—1.4%
Ni—8.5%
Cr—11.4%
Ti—0.2%
Al—0.05%
Mo—1.8%
Zr—0.02%
Ca—0.001%
B—0.001%
S—not in excess of 0.01%*
P—not in excess of 0.01%*

* Undesirable inevitable admixtures present in the filling stock.

ness of the welded components being 10-30 mm. are given in the following table.

| Ser. No. | Mechanical characteristics | Unit | Numeric values of mechanical characteristics |
|---|---|---|---|
| 1 | Tensile strength of the welded joint | Kg./mm.² | 110 |
| 2 | Yield point of the welded joint | Kg./mm.² | 90 |
| 3 | Impact ductility of weld metal with a Menagé notch (radius in the notch equaling 1 mm.) at room temperature. | Kgm./cm.² | 12 |
| 4 | Impact ductility of weld metal with a Menagé notch (radius in the notch equaling 1 mm.) at a temperature of −70° C. | Kgm./cm.² | 10 |
| 5 | Impact ductility of weld metal with a Menagé notch (radius in the notch equaling 1 mm.) at a temperature of −196° C. | Kgm./cm.² | 7 |
| 6 | Impact ductility of weld metal, specimen with a fatigue crack 1.5 mm. deep, at room temperature. | Kgm./cm.² | 8 |

EXAMPLE 2

The alloy may have the following composition (in weight percent):

C—not in excess of 0.03%
Mn—0.8%
Si—1.6%
Ni—8.7%
Cr—11.6%
Ti—0.25%
Al—0.07%
Mo—2.0%
Zr—0.04%
Ca—0.003%
B—0.002%
S—not in excess of 0.001%*
P—not in excess of 0.001%*

* Undesirable inevitable admixtures present in the filling stock.

EXAMPLE 3

The alloy may have the following composition (in weight percent):

C—not in excess of 0.03%
Mn—0.9%
Si—1.7%
Ni—9.0%
Cr—11.8%
Ti—0.3%
Al—0.1%
Mo—2.2%
Zr—0.08%
Ca—0.05%
B—0.003%
S—not in excess of 0.001%*
P—not in excess of 0.001%*

* Undesirable inevitable admixtures present in the filling stock.

The welding wire of all the above-cited compositions provides for obtaining weld metals with very similar mechanical properties, whose typical values for the thick- In welding low-carbon steels with the proposed wire no heat treatment is necessary after welding, which makes producing large-size welded structures possible. Welded joints with the proposed wire, unlike all the conventional martensite fillers, are capable of maintaining high ductility not only at low temperatures (−70° C.), but at cryogen temperatures (−196° C.) as well. Therefore employment of such wire permits providing strong welded units for various machines of cryogen technology.

The proposed welding wire of the above-described composition must be produced in vacuum induction furnaces.

What we claim is:

1. A martensite stainless steel for use as a filler in welding steels, mainly stainless steels, consisting of:

C—not in excess of 0.03%
Mn—0.6–0.9%
Si—1.4–1.7%
Ni—8.5–9.0%
Cr—11.4–11.8%
Ti—0.2–0.3%
Al—0.05–0.1%
Mo—1.8–2.2%
Zr—0.02–0.08%
Ca—0.001–0.05%
B—0.001–0.003%
Fe—the balance, with the exception of accidential impurities.

References Cited

UNITED STATES PATENTS

| 2,047,918 | 7/1936 | Lohr | 75—124 |
| 3,177,577 | 4/1965 | Fujimura | 75—128 T |
| 3,362,813 | 1/1968 | Ziotkowski | 75—124 |
| 3,408,178 | 10/1968 | Myers | 75—124 |
| 3,556,776 | 1/1971 | Clarke | 75—124 |

HYLAND BIZOT, Primary Examiner

U.S. Cl. X.R.

75—128 R